US010428867B2

United States Patent
Steinlage et al.

(10) Patent No.: US 10,428,867 B2
(45) Date of Patent: Oct. 1, 2019

(54) ROCKSHAFT END CAP (71) Applicant: Deere & Company, Moline, IL (US)

(72) Inventors: David L. Steinlage, Centralia, KS (US); Jeremy Nefzger, Ankeny, IA (US); Ritesh S. Hargude, Nagpur (IN)

(73) Assignee: DEERE & COMPANY, Moline, IL (US)

( * ) Notice: Subject to any disclaimer, the term of this patent is extended or adjusted under 35 U.S.C. 154(b) by 285 days.

(21) Appl. No.: 15/239,362

(22) Filed: Aug. 17, 2016

(65) Prior Publication Data
US 2017/0188506 A1    Jul. 6, 2017

Related U.S. Application Data (60) Provisional application No. 62/275,435, filed on Jan. 6, 2016.

(51) Int. Cl.
*A01B 71/04*    (2006.01)
*F16C 19/00*    (2006.01)

(52) U.S. Cl.
CPC .............. *F16C 19/00* (2013.01); *A01B 71/04* (2013.01)

(58) Field of Classification Search
CPC .......... A01B 71/04; F16C 17/02; F16C 35/02
See application file for complete search history.

(56) References Cited

U.S. PATENT DOCUMENTS

| | | | |
|---|---|---|---|
| 3,934,953 A * | 1/1976 | Tooley | F16C 35/00 384/210 |
| 3,967,437 A | 7/1976 | Mott et al. | |
| 4,529,215 A * | 7/1985 | Strand | A01B 63/22 172/413 |
| 6,932,512 B2 * | 8/2005 | Cox | F16C 35/02 384/434 |
| 7,465,099 B2 | 12/2008 | Connell et al. | |
| 9,555,976 B2 * | 1/2017 | Eure | B65G 39/09 |
| 9,648,799 B2 * | 5/2017 | Ohnsat | A01B 63/114 |
| 2007/0201780 A1 * | 8/2007 | Connell | A01B 63/16 384/275 |
| 2015/0189824 A1 * | 7/2015 | Johansson | A01B 71/04 172/264 |

* cited by examiner

*Primary Examiner* — Matthew Troutman
(74) *Attorney, Agent, or Firm* — Michael Best & Friedrich LLP (57) ABSTRACT

An agricultural vehicle includes a frame, a wheel supporting the frame, and a rockshaft coupled to the frame and operable to pivot with respect to the frame. The rockshaft has an outer surface, an inner surface and an open end. An internal end cap is positioned on the open end of the rockshaft. The internal end cap has an inner surface and an outer surface. The inner surface of the internal end cap contacts the outer surface of the rockshaft. An external end cap is positioned on the open end of the rockshaft and contacts the outer surface of the internal end cap. A fastener connects the external end cap to the frame to retain the external end cap on the rockshaft.

20 Claims, 12 Drawing Sheets

ROCKSHAFT END CAP

FIELD OF THE DISCLOSURE

This disclosure relates generally to the protection of shafts or axles such as rockshafts used on agricultural implements.

BACKGROUND OF THE DISCLOSURE

Vehicle or implement rockshafts include shafts or axles that rotate or pivot backwards and forwards about their journals or the portion contained by a bearing. In agricultural implements like tillage cultivators or seeding planters, tubular rockshafts are utilized, for example, to control a height on the implement frames and disk gang attachments. The rockshaft pivots about a central axis so that the shaft and anything attached to the shaft moves with respect to the ground surface. Some bearing block assemblies support the shaft from a frame, and a hydraulic cylinder rotates the rockshaft to move objects hanging from the shaft with respect to the ground surface. As the rockshaft pivots, often under very heavy loading, wear occurs between the rockshaft and the bearing block. Grease lubrication is used to reduce the wear, but this leads to performance problems and down-time, among other issues.

SUMMARY OF THE DISCLOSURE

Various aspects of example embodiments are set out below and in the claims. Embodiments include internal end caps that fit over the ends of a rockshaft. Other embodiments are disclosed in the detailed description, accompanying drawings and claims.

Some embodiments provide an agricultural vehicle includes a frame, a wheel supporting the frame, and a rockshaft coupled to the frame and operable to pivot with respect to the frame. The rockshaft has an outer surface, an inner surface and an open end. An internal end cap is positioned on the open end of the rockshaft. The internal end cap has an inner surface and an outer surface. The inner surface of the internal end cap contacts the outer surface of the rockshaft. An external end cap is positioned on the open end of the rockshaft and contacts the outer surface of the internal end cap. A fastener connects the external end cap to the frame to retain the external end cap on the rockshaft.

Some embodiments include an industrial task machine comprising a frame, a wheel supporting the frame, and a rockshaft coupled to the frame and operable to pivot with respect to the frame. The rockshaft has an outer surface, an inner surface, a first open end and a second open end. A first internal end cap is positioned on the first open end of the rockshaft. The internal end cap has an inner surface and an outer surface. The inner surface of the internal end cap contacts the outer surface of the rockshaft. A first external end cap is positioned on the first open end of the rockshaft. The external end cap contacts the outer surface of the internal end cap. A first fastener connects the external end cap to the frame to retain the external end cap on the rockshaft. A second internal end cap has an inner surface and an outer surface. The second internal end cap is positioned on the second open end of the rockshaft and contacts the outer surface of the rockshaft. A second external end cap is positioned on the second open end of the rockshaft and contacts the outer surface of the second internal end cap. A second fastener connects the second external end cap to the frame to retain the second external end cap on the rockshaft.

Some embodiments provide a rockshaft end cap assembly connected to a rockshaft having an outer surface, an inner surface and an open end. The rockshaft end cap assembly includes an internal end cap positioned on the open end of the rockshaft. The internal end cap has an inner surface and an outer surface. The inner surface of the internal end cap contacts the outer surface of the rockshaft. The rockshaft end cap assembly further includes an external end cap positioned on the open end of the rockshaft. The external end cap contacts the outer surface of the internal end cap. The rockshaft end cap assembly further includes a fastener connecting the external end cap to a vehicle frame to retain the external end cap on the rockshaft.

This disclosure includes embodiments of an internal end cap (e.g. 70 in FIG. 5) positioned on an end of a shaft such as a rockshaft used in agricultural implements. The internal end cap acts like a smooth liner or buffer between the end region of the rockshaft and any outer external housing. The rockshaft together with the internal end cap can readily pivot in the outer external housing without a messy coat of grease, greasing or oiling or impregnating with the oil.

Some embodiments of end caps include a tapered cup that is pushed or tucked over the end of the rockshaft. Outside of the rockshaft and internal end cap is an external housing (e.g., a tube) including an external end cap and flanges, usually made of steel casting, that fits over the rockshaft and over the internal end cap. The internal tapered end cap can be made of smooth material that is wear resistant and replaces the friction-reducing grease normally placed between the ends of the rockshaft and the external end cap. The smooth internal tapered end cap can prevent abrasive metal-to-metal (shaft-to-external end cap) contact under thrust or radial loading when the agricultural implement moves across the uneven soil. The coefficient of friction of the internal end cap material is low enough to maintain smooth, quiet rockshaft operation and to reduce frictional wear problems in all planes of contact with the external end cap in order to reduce or eliminate rockshaft and external end cap maintenance. Other embodiments of the internal end cap are described below.

BRIEF DESCRIPTION OF THE DRAWINGS

The Detailed Description refers to the following example figures.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
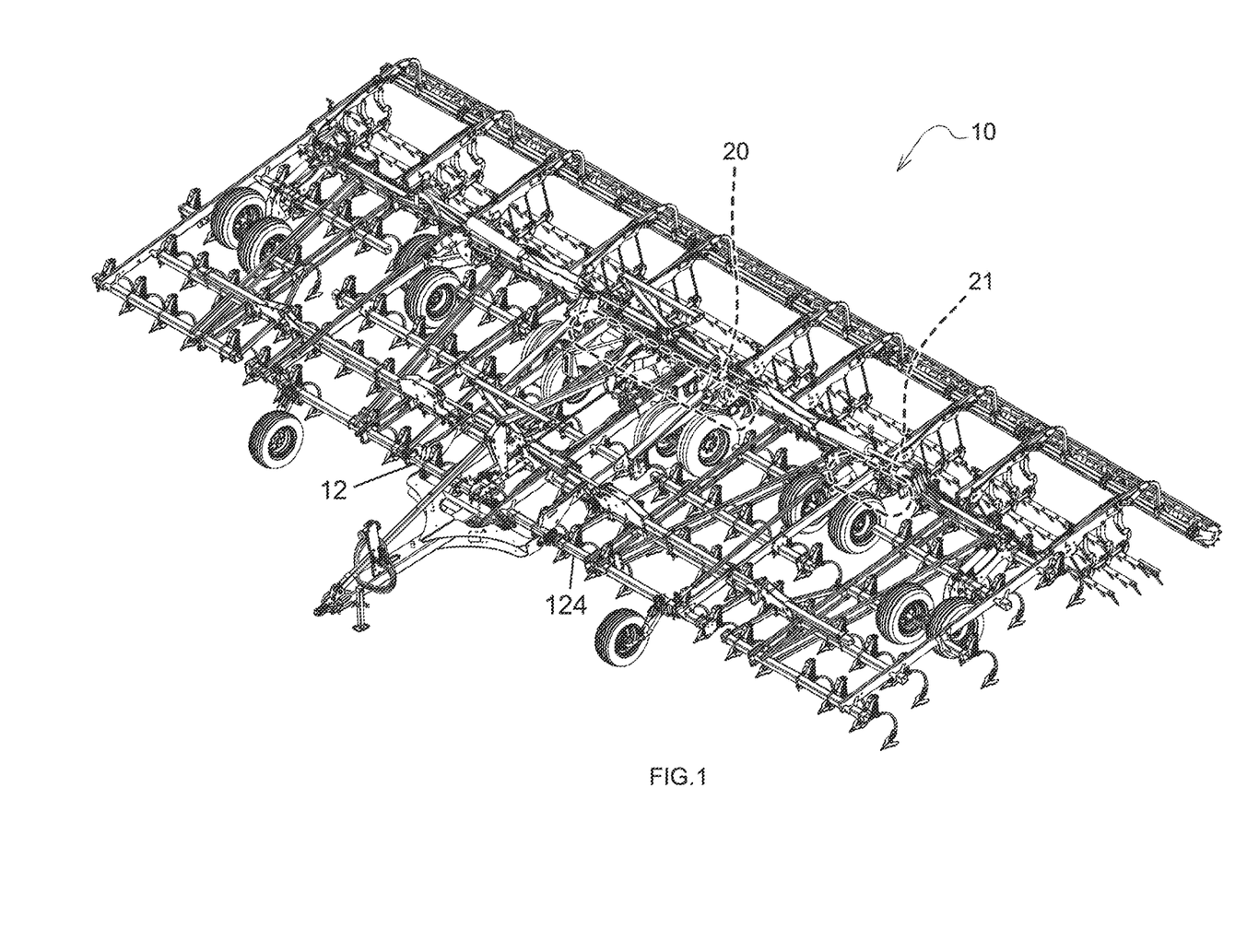
FIG. 1 depicts a perspective view of a cultivator containing at least two visible rockshafts.
Figure 2:
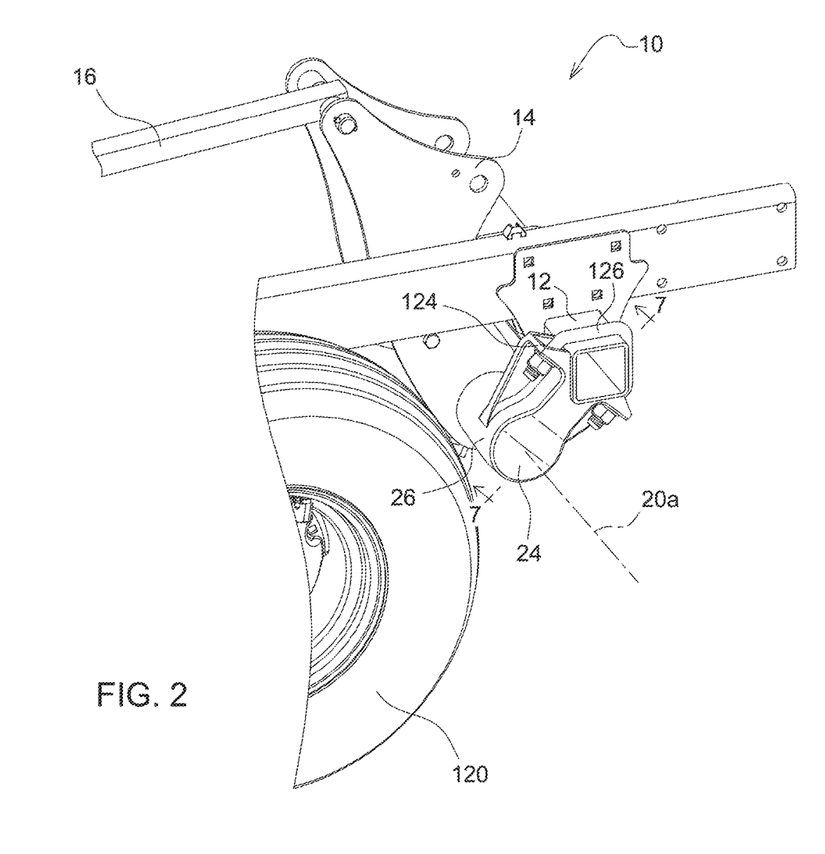
FIG. 2 depicts an upper side perspective magnified view of one rockshaft of FIG. 1 with an external end cap of the rockshaft.

FIG. 1 shows an agricultural tillage implement in the form of a cultivator 10 having a main frame 12. Other examples include seeding planters or towed spray tanks. The illustrated cultivator 10 includes multiple transversely extending rockshafts 20 and 21. A magnified view of the shorter of the two rockshafts, 21, is shown in FIG. 2. The illustrated rockshafts 21 has a circular cross section and are connected to a bearing block assembly or a lift yoke 14 (see FIG. 2).

Figure 3:
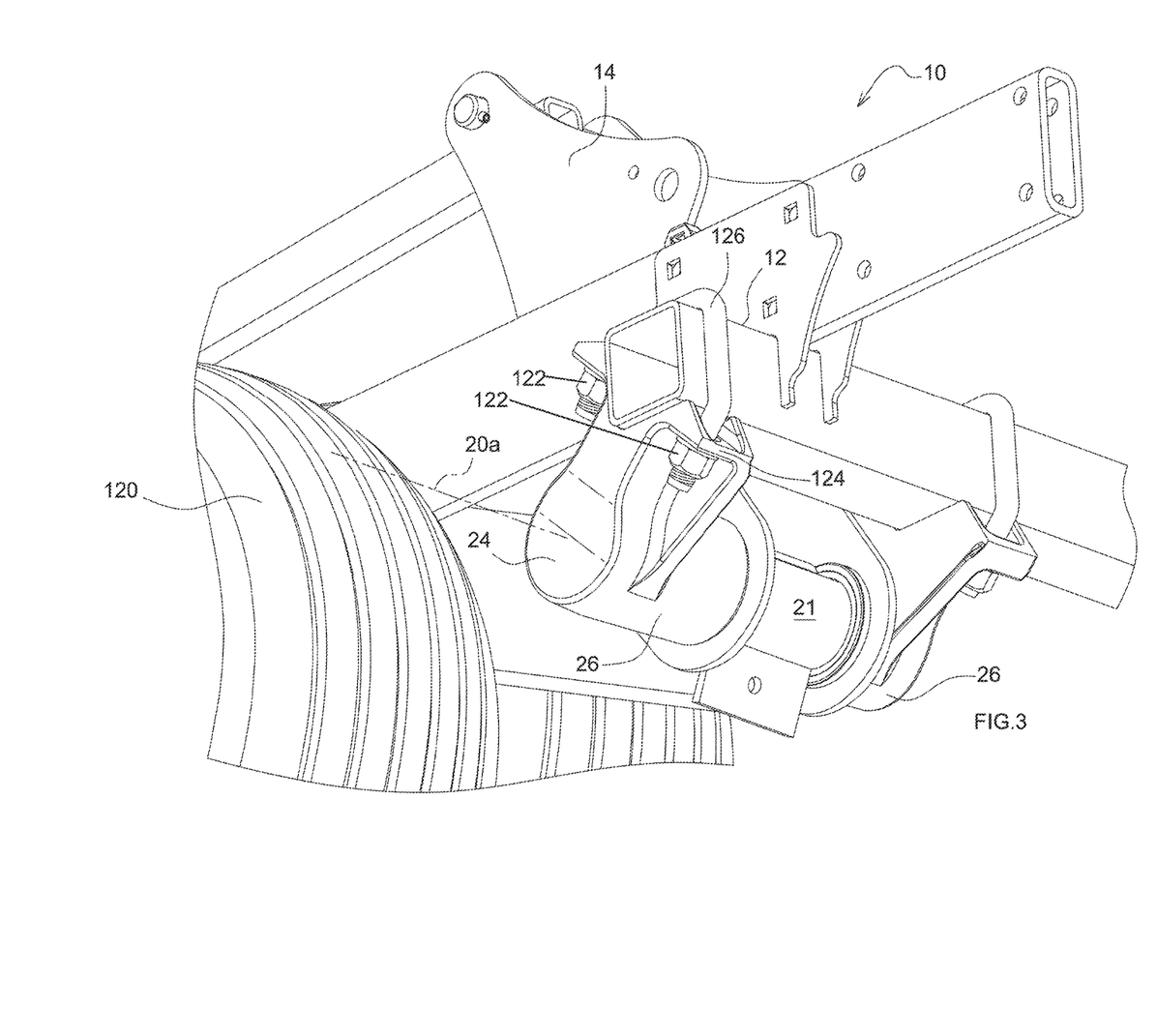
FIG. 3 depicts a lower side perspective magnified view of the rockshaft of FIG. 2 and external end caps on either side of the rockshaft of FIG. 2.
Figure 4:
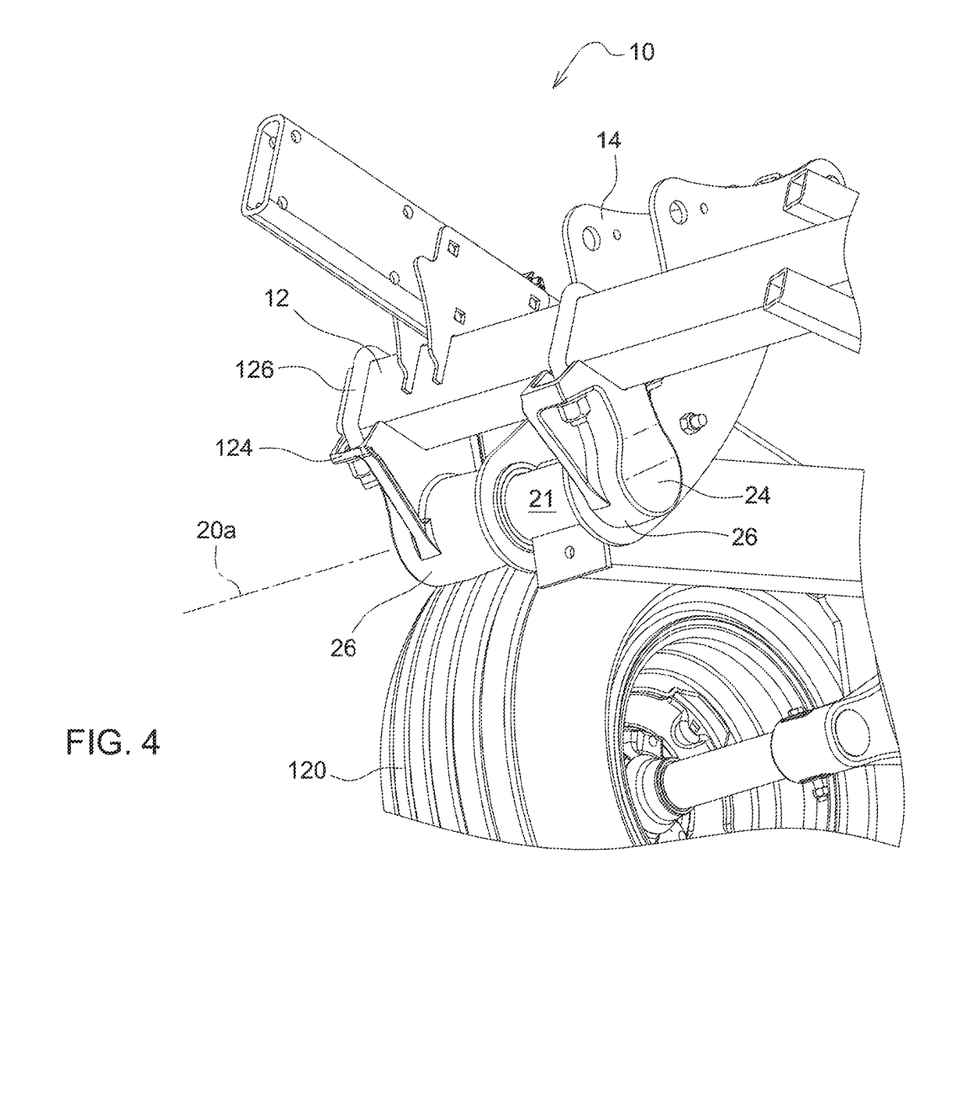
FIG. 4 depicts an inside lower side perspective magnified view of FIG. 2.

In FIGS. 2-4, rockshaft 21 is capped on both ends by a respective external end cap 26 having an external end surface 24. The external end caps 26 are mounted to a transverse frame tube 124 of the main frame 12. A rectangular or V-shaped bolt 126 and nuts 122 (see, e.g., FIG. 5) attach the external end cap 26 to the transverse frame tube 124 of the main frame 12. Hydraulic or hydro-electric cylinders (not shown) are connected to a lift yoke 14 by a bar 16. The cylinders pull and push on the bar 16, which in turn pulls or pushes the lift yoke 14 to pivot the rockshaft 21 about a transverse rockshaft central axis 20a. The cultivator 10 is supported by a plurality of lift wheel assemblies 120. Rockshaft 21 then lifts or lowers one or more of portions of the frame 12 with respect to the wheel assemblies 120 of the cultivator 10.

There are external end caps 26 on either side of the rockshaft 21. As can be seen from FIG. 3, reaching one side of the rockshaft 21 is easier on the outer side of the cultivator 10. By contrast, the other side of the rockshaft 21 is harder to reach with tools or to service (e.g. lubricate). Rockshaft 20 in the rear center of the cultivator 10 is even more difficult to service when the rockshaft 20 or its ends wear out, rust, or collect dirt and residue. To overcome this and other problems, an internal end cap is introduced on both ends of rockshafts 20 and 21.

Figure 5:
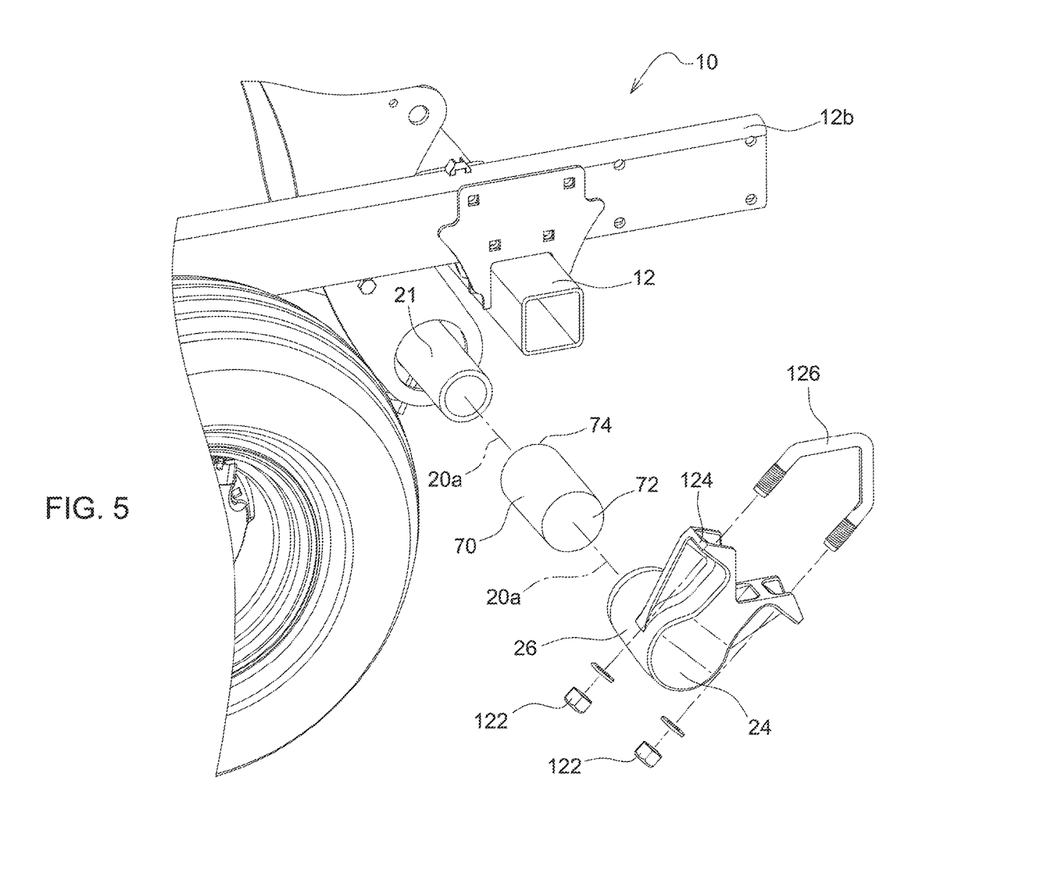
FIG. 5 depicts a partial exploded upper view of the rockshaft and internal and external end caps of FIGS. 2-4.

FIG. 5 depicts a partially exploded upper view of the rockshaft 21 and internal end cap 70 and external end caps 26 of FIGS. 2-4. The illustrated internal end cap 70 is a one piece cylinder with an open end 74 and a closed end 72. Internal end cap 70 is made of a material with a coefficient of kinetic or sliding friction that is low enough (e.g., less than 0.2) to maintain smooth, quiet rockshaft operation and to reduce frictional wear problems in all planes of contact with the external end cap 26. For example, the material may include polyethylene and ultra high molecular weight polyethylene (UHMW, e.g. molecular weight of 3.1 million or higher). Other materials having low or lower friction coefficient and high abrasion resistance as UHMW are also suitable. For example, hard molded nylon impregnated with oil or grease is another embodiment. UHMW is self-lubricating, which reduces a need for servicing or periodic lubricating of the rockshaft 21. However, in some embodiments, the internal end cap 70 is still lubricated or impregnated with oil or grease to further reduce the amount of friction.

In FIG. 5, the illustrated internal end cap 70 is tapered (e.g. by 0.25 to 0.5 degrees) from the open end 74 to the covered or closed end 72. That is, the diameter of the circular open end 74 is slightly larger than the diameter of the closed end 72 in order to make it easier to mount the internal end cap 70 onto the rockshaft 21. Most rockshafts are tubular with a circular cross section to permit a large range of motion about its central axis 20a. However, if the needed range of motion is small or there is limited rotational motion, then in some embodiments the rockshaft 21 has a more oval, or hexagonal or octagonal cross section with rounded corners. In these embodiments, the internal end cap 70 has a corresponding cross sectional shape in order to fit snugly over the end of the rockshaft 21.

Figure 6:
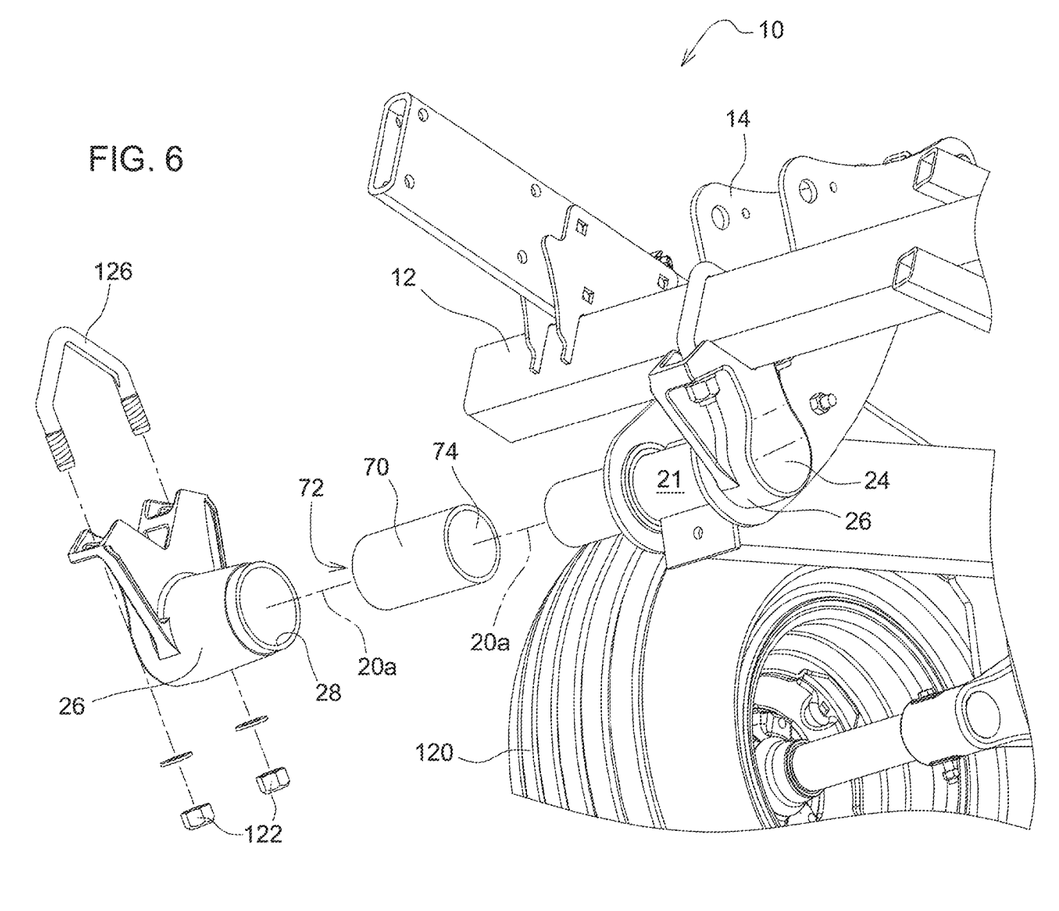
FIG. 6 depicts another partial exploded view of the rockshaft and internal and external end caps of FIG. 5.

FIG. 6 depicts another partial exploded view of the rockshaft 21 and the external end cap 26 and internal end cap 70 illustrated in FIG. 5, but showing the open end 74 of the internal end cap 70. The external end cap 26 has an inner surface 28 which is sized to receive the internal end cap 70 and the rockshaft 21. The internal end cap 70 has a wall thickness of 5-7 mm. The interior and exterior wall of the illustrated internal end cap 70 is smooth. Part way along the length of the internal end cap, the inner diameter of the internal end cap 70 is the same as the outer diameter of the rockshaft 21. The internal end cap 70 is pushed against an end of the rockshaft 21 with enough force so that the internal end cap 70 remains tightly on the end on the rockshaft 21 past where the two diameters match. In this embodiment, both ends of rockshaft 21 are covered by a respective internal end cap 70. The external end cap 26 fits over the internal end cap 70.

Figure 7:
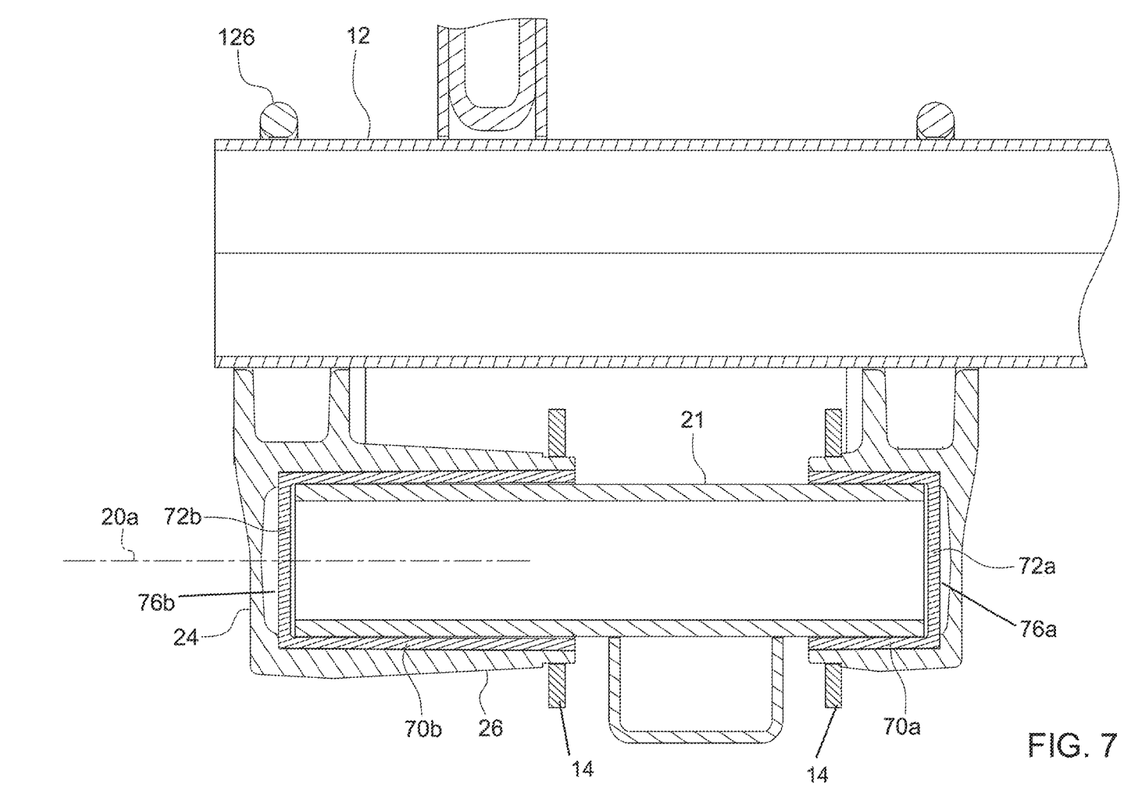
FIG. 7 depicts a cutaway side view of the internal end caps and rockshaft taken along line 7-7 of FIG. 2.
Figure 7A:
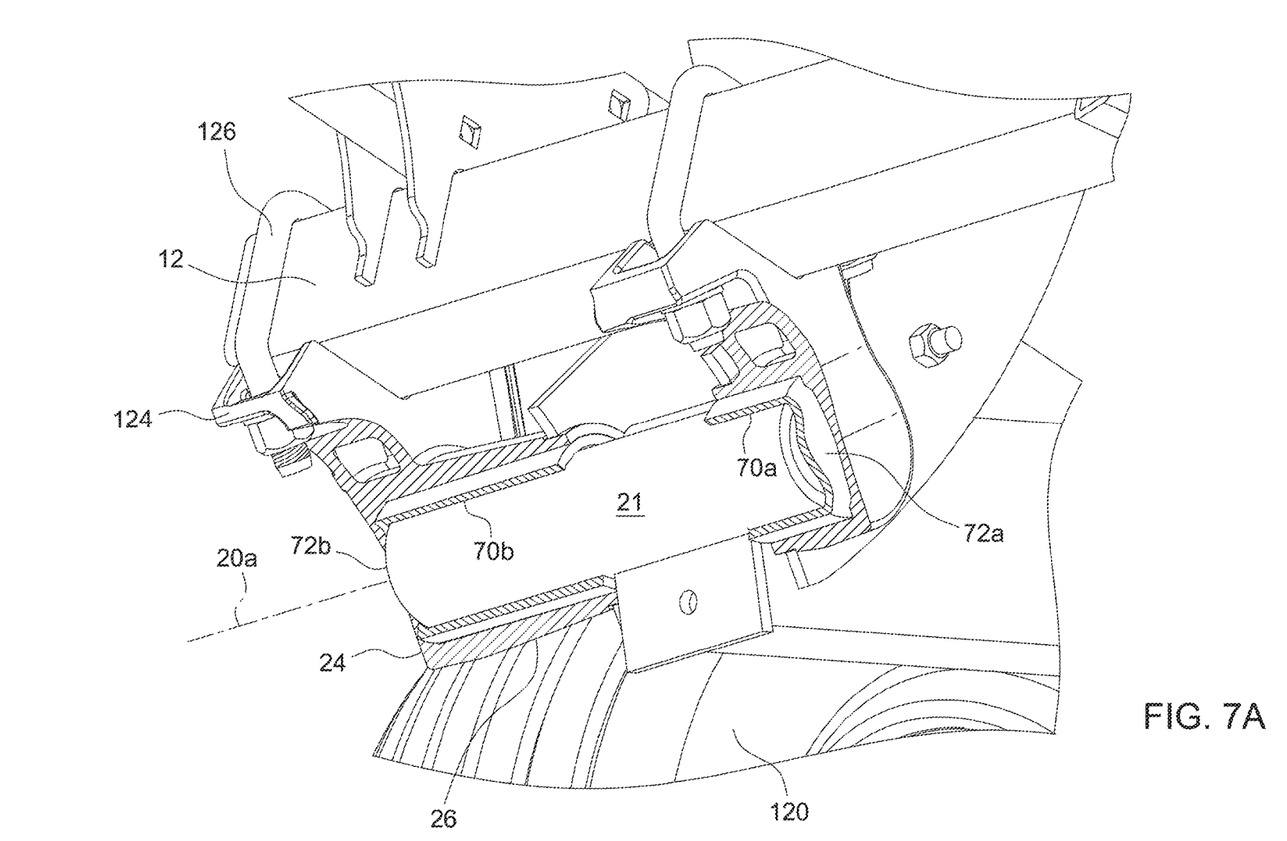
FIG. 7A depicts a partial cutaway perspective view of the internal end caps and rockshaft of FIG. 7.

FIG. 7 depicts a cutaway side view of two example internal end caps 70a, 70b and the rockshaft 21 of FIG. 2. FIG. 7A depicts a partial cutaway perspective view of the example internal end caps and rockshaft of FIG. 7. Each internal end cap 70a and 70b includes a respective closed end surface 72a and 72b. The lengths of the illustrated internal end caps 70a and 70b differ and are based on where the lift yoke 14 is coupled to the rockshaft 21. In FIG. 7, there is an air pocket 76a, 76b between the respective closed end surface 72a, 72b and a respective end surface 24 of the corresponding external end cap 26. In the illustrated embodiment, the depth of each air pocket 76a and 76b is proportional to the length of the internal end cap 70; the longer the internal end cap 70, the greater the depth of the associated air pocket. In profile cross-section as shown in FIG. 7, the air pockets span the outer diameter of the rockshaft 21 (or the inner diameter of the internal end caps 70a and 70b). In some embodiments, the air pockets can have a diameter corresponding to the inner diameter of the rockshaft 21. In some embodiments, the air pockets are substantially smaller than the illustrated air pockets 76a, 76b. In some embodiments, the air pockets are omitted and closed end surfaces 72a, 72b of the respective end caps 70a, 70b abut the respective end surface 24 of the respective external end cap 26.

The example air pockets 76a and 76b have rounded ends. That is, the inner closed-end surface of the external end cap 26 has rounded ends and comes to a trough point in the center rather than have a flat or planar surface. As can be seen in FIG. 7, the internal end caps 70a, 70b serve to line the space between the rockshaft 21 and the external end caps 26. As shown, the cylindrical side wall of each internal end cap 70a and 70b contacts the surface of the rockshaft 21 and the cylindrical side wall of the respective external end cap 26.

Figure 8:
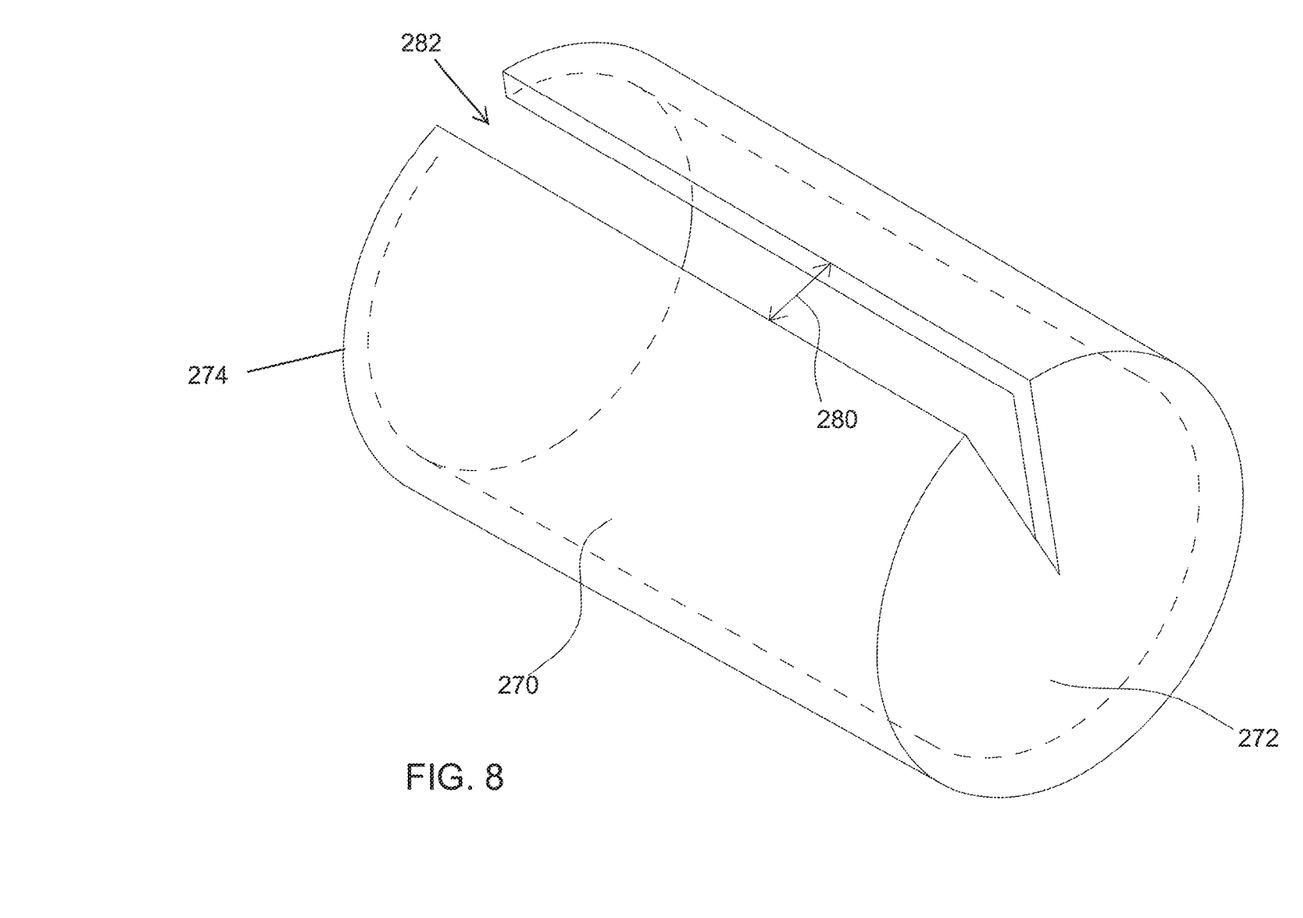
FIG. 8 depicts an embodiment of an internal end cap having an example slit along the side.

FIG. 8 depicts another embodiment of an internal end cap 270 having a slit 282 along the length of the side wall of the cylindrical wall of 270. The illustrated slit 282 is parallel to the central axis of the rockshaft. Although not shown, other example slits include slits along only part of the length of the cylindrical surface either parallel to or transverse to the central axis of the cylinder. In most embodiments, the arc distance 280 between the two sides of the slit 282 spans substantially zero degrees; that is, the slit 282 is a cut through the side wall. In some embodiments, the arc distance 280 is 0-2 millimeters. The slit 282 makes it easier to mount or pull the internal end cap 270 onto an end of the external rockshaft. With the slit 282, the internal end cap 270 is either tapered or free of tapering (i.e., having a uniform radius from the open end 274 to the closed end 272). In some embodiments, the slit can include partial slits along only the cylindrical surface either parallel to or crosswise to the central axis of the cylinder.

Figure 9:
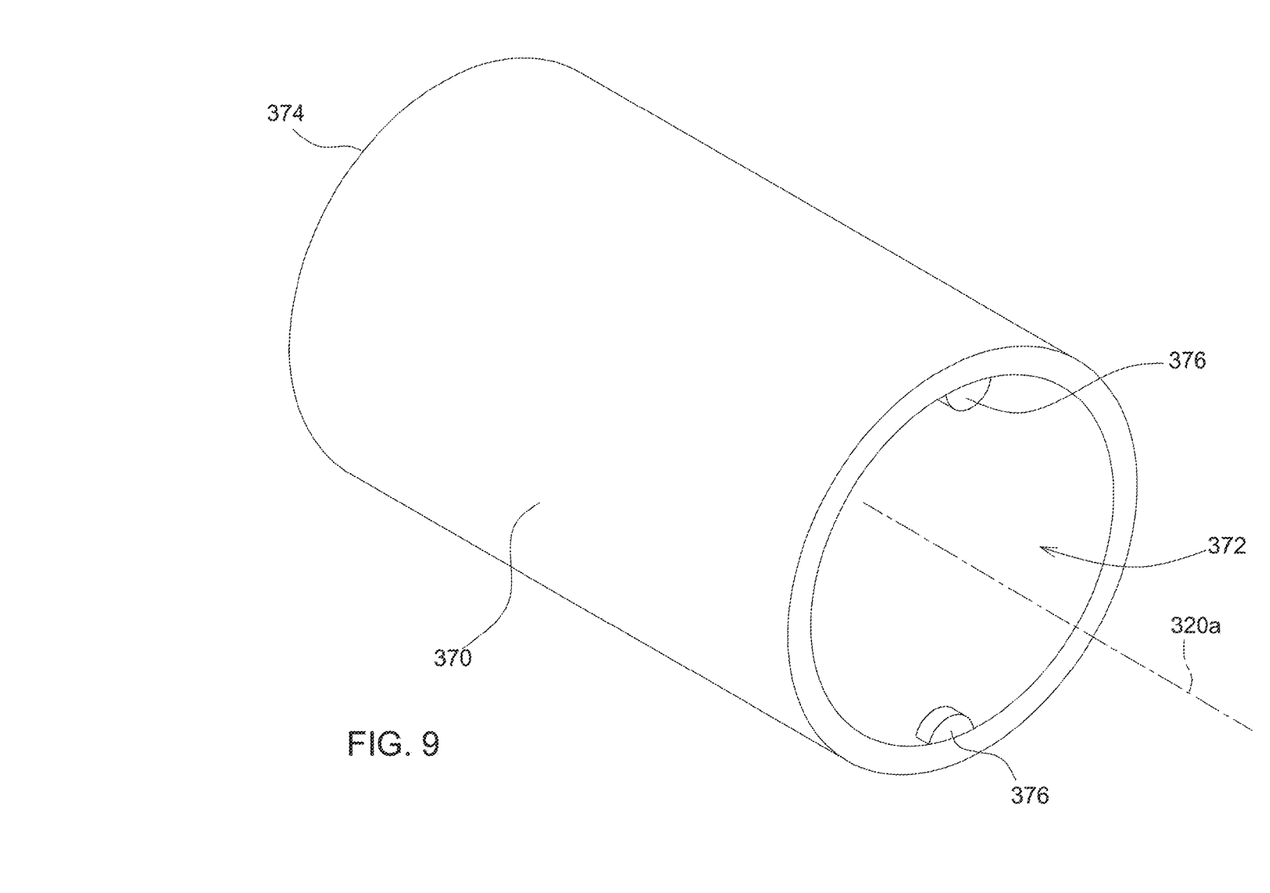
FIG. 9 depicts an embodiment of an internal end cap having protrusions that help retain the internal end cap to the rockshaft.

FIG. 9 depicts another embodiment of an internal end cap 370 having a first open end 372, a second open end 374 and extending along axis 320a. The illustrated internal end cap 370 includes two protrusions 376 that help retain the internal end cap 370 on the rockshaft. In some embodiments, the internal end cap 370 is tapered such that the diameter of the first open end 372 is less than the diameter of the second open end 374. In some embodiments, the rockshaft also has corresponding recesses that mate with the respective protrusion 376 on the internal surface of the internal end cap 370. In other embodiments, the end surface of the rockshaft has a protrusion and the inner surface of the internal end cap 370 is either smooth or has a corresponding recess that mates to the protrusion. The protrusions and recesses can help to keep the internal end cap 370 mounted more snugly or tightly on the end of the rockshaft.

Figure 10:
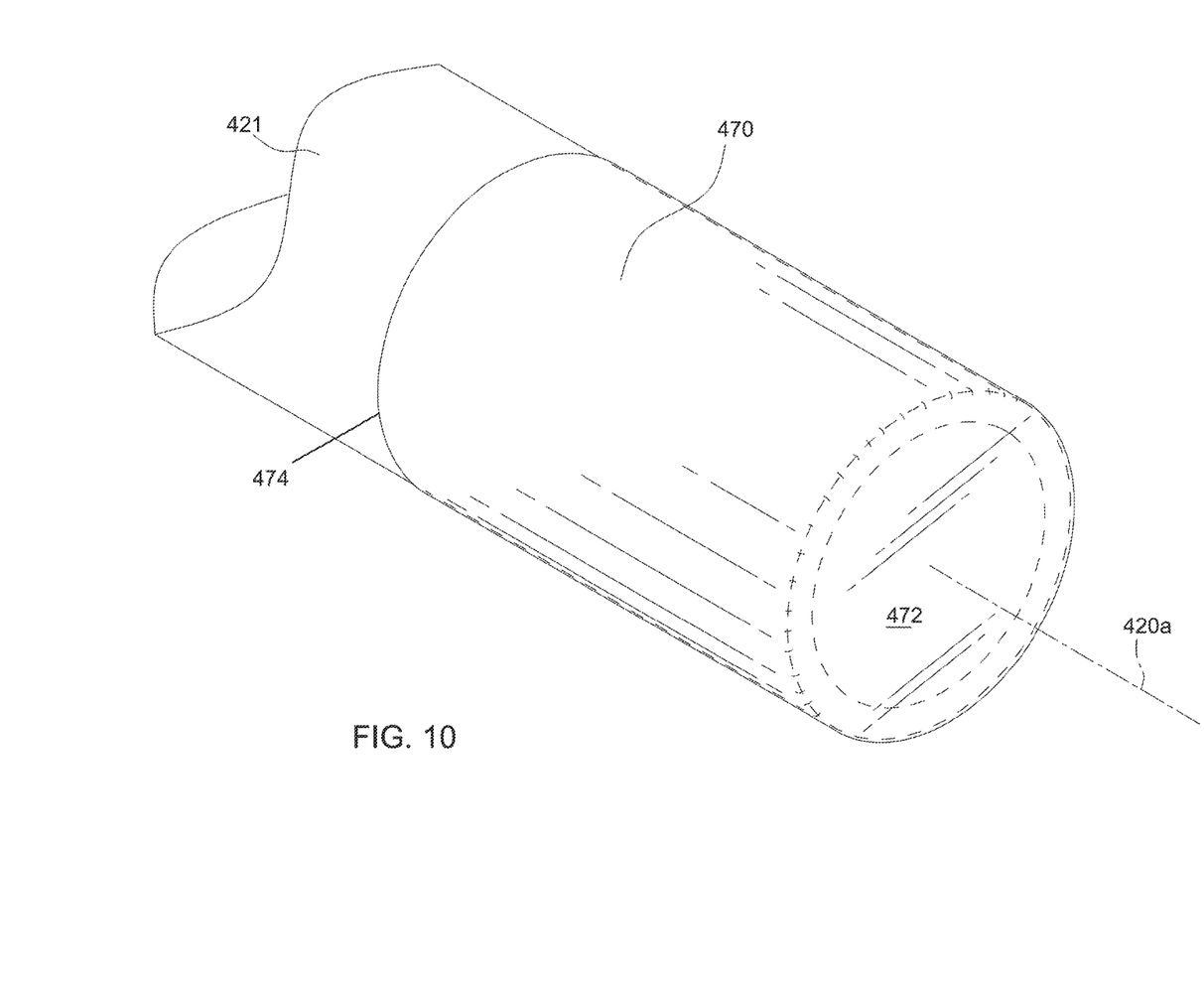
FIG. 10 depicts an embodiment of an internal end cap that shrink wraps on an end of a rockshaft.

FIG. 10 depicts another embodiment of an internal end cap 470 having a closed end 472, an open end 474 and extending along axis 420a. The illustrated internal end cap 470 shrink wraps onto an end of a rockshaft 421. The polyethylene material or other polymers (e.g., PVC or a combination of polyethylene and PVC or polypropylene) shrinks tightly over the end of the rockshaft 421 when heat is applied (e.g., over 90 degrees C.). A quick heat treatment (e.g., through a heat tunnel or by inserting a heated rockshaft 421 into the internal end cap 470) is applied just long enough to shrink the polyethylene material a little so that the internal end cap 470 still retains its shape and functions as a low friction liner that, together with the rockshaft 421, can still readily rotate or pivot in the external end cap or other external housing. In this scenario, in one embodiment, the internal end cap 470 has either a uniform or a tapered diameter along the length of the internal end cap 470. Whether uniform or tapered, the diameter is larger than the outer diameter of the rockshaft 421 for easy insertion without use of tools. Since the material of the internal end cap 470 shrinks, it will stay snugly on the rockshaft 421.

In some embodiments, a dense rubber material is used for the illustrated internal end cap 470 so that it withstands abrasion. For example, an industrial urethane rubber (e.g., PMC-790 urethane rubber) is used to form a cylindrical cup. The rubber cup is also impregnated with oil or greased from the outer surface inward so that the cup and its outer surface has a low coefficient of friction. The rubber cup is again tapered like the polyethylene version with the open end 472 having a larger diameter than the closed end 474 so that the internal end cap 470 can be readily mounted on the end of the rockshaft 421.

Figure 11:
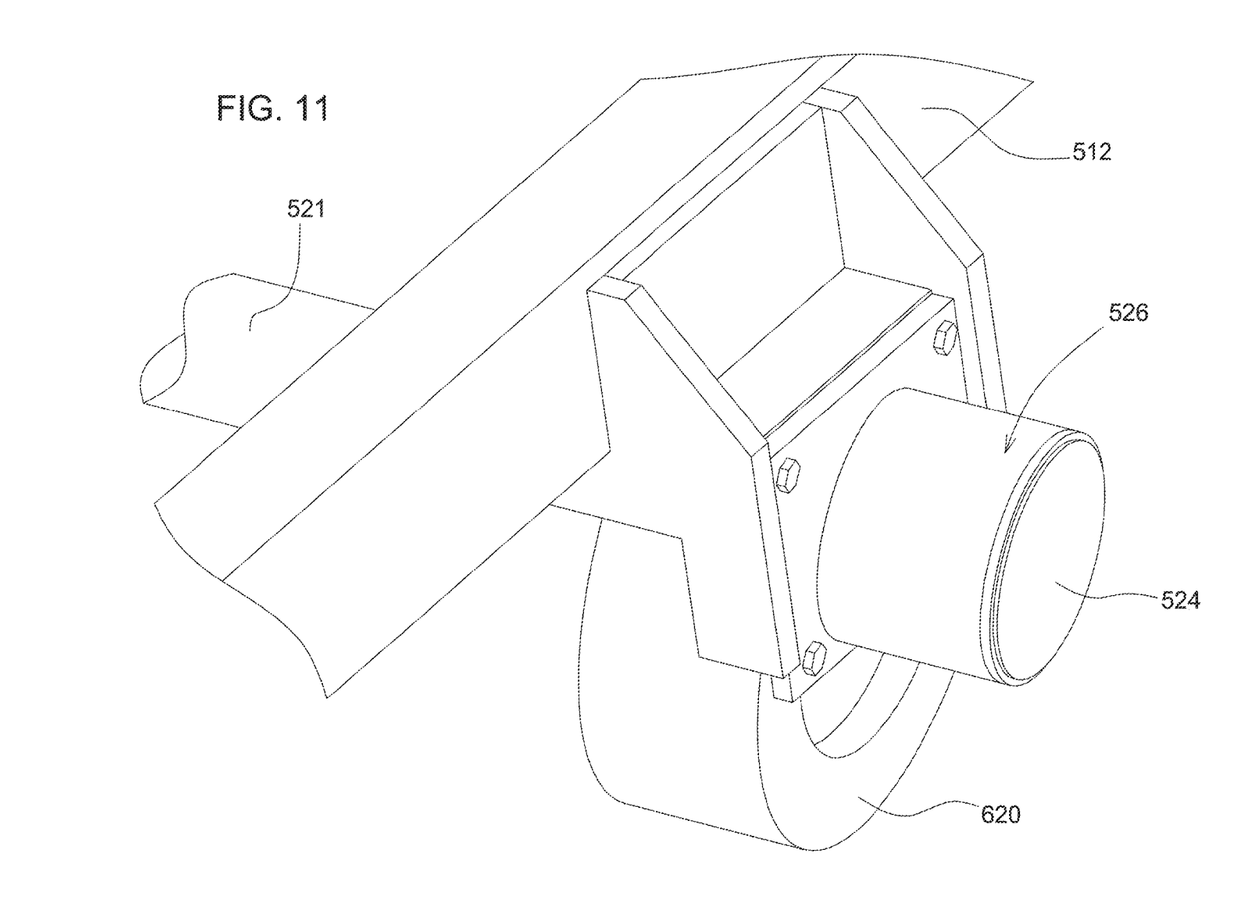
FIG. 11 depicts an upper side view of an embodiment of an external end cap.

FIG. 11 depicts another embodiment of an external end cap 526 that includes a smooth cylinder on the outside, free of any collars, flanges or attachments. The illustrated external end cap 526 includes a closed end 524 and is coupled to rockshaft 521 and wheel assembly 620. Since this is a free hanging external end cap 526, not directly attached to the frame 512, there tends to be less abrasive force on the external end cap 526 and on an internal end cap (a hard molded nylon internal end cap (not shown in FIG. 11) impregnated with oil or grease is often sufficient).

Although the focus of the aforementioned embodiments is on agricultural implements, construction machines or other uses of rockshafts also exist. For example, lift shafts in construction machines include rockshafts housed in external tubes. Positioning one of the example internal end caps in this equipment improves the life of the machine. The internal end cap liner eliminates a need for periodic greasing or metal-to-metal contact between the rockshaft and the external end housing. Also, although the disclosure focused on the shorter rockshaft 21, any of the embodiments also apply to the longer rockshaft 20.

In the present disclosure, the descriptions and example embodiments should not be viewed as limiting. Rather, there are variations and modifications that may be made without departing from the scope of the appended claims.

What is claimed is:

1. An agricultural vehicle comprising:
a frame;
a wheel supporting the frame;
a rockshaft coupled to the frame and operable to pivot with respect to the frame, the rockshaft having an outer surface and an open end;
an internal end cap positioned on the open end of the rockshaft, the internal end cap having an inner surface and an outer surface, the inner surface of the internal end cap contacting the outer surface of the rockshaft;
an external end cap positioned on the open end of the rockshaft, the external end cap contacting the outer surface of the internal end cap; and
a fastener coupling the external end cap to the frame to retain the external end cap on the rockshaft.

2. The agricultural vehicle of claim 1, further comprising at least one implement coupled to the frame, the at least one implement positioned to engage a ground surface when the rockshaft is in a first rotational position and positioned to not engage the ground surface when the rockshaft is in a second rotational position.

3. The agricultural vehicle of claim 2, wherein the frame is positioned a first distance from the ground surface when the rockshaft is in the first rotational position and the frame is positioned a second distance from the ground surface when the rockshaft is in the second rotational position, wherein the first distance is less than the second distance.

4. The agricultural vehicle of claim 1, wherein the end cap includes a protrusion that surrounds a first portion of a frame section and the fastener surrounds a second portion of the frame section to couple the end cap to the frame.

5. The agricultural vehicle of claim 4, wherein the end cap protrusion and the fastener substantially encircle the frame section.

6. The agricultural vehicle of claim 4, wherein the protrusion of the end cap inhibits rotation of the external end cap about the frame section.

7. The agricultural vehicle of claim 4, wherein the inhibits rotation of the external end cap about the frame section.

8. The agricultural vehicle of claim 1, wherein the internal end cap has a first end having a first diameter and a second end having a second diameter that is less than the first diameter, such that the internal end cap is tapered between the first end and the second end.

9. The agricultural vehicle of claim 1, wherein the coefficient of friction between the external end cap and the rockshaft is 0.2 or less.

10. The agricultural vehicle of claim 1, wherein the external end cap is rotatable with respect to the internal end cap.

11. An industrial task machine comprising:
a frame;
a wheel supporting the frame;
a rockshaft coupled to the frame and operable to pivot with respect to the frame, the rockshaft having an outer surface, a first open end, and a second open end;
a first internal end cap positioned on the first open end of the rockshaft, the internal end cap having an inner surface and an outer surface, the inner surface of the internal end cap contacting the outer surface of the rockshaft;
a first external end cap positioned on the outer surface of the internal end cap;
a first fastener coupling the external end cap to the frame to retain the external end cap on the rockshaft;
a second internal end cap having an inner surface and an outer surface, the second internal end cap positioned on the second open end of the rockshaft and contacting the outer surface of the rockshaft;
a second external end cap positioned on the second open end of the rockshaft and contacting the outer surface of the second internal end cap; and
a second fastener coupling the second external end cap to the frame to retain the second external end cap on the rockshaft.

12. The industrial task machine of claim 11, further comprising at least one implement coupled to the frame, the at least one implement positioned to engage a ground surface when the rockshaft is in a first rotational position and positioned to not engage the ground surface when the rockshaft is in a second rotational position.

13. The industrial task machine of claim 12, wherein the frame is positioned a first distance from the ground surface when the rockshaft is in the first rotational position and the frame is positioned a second distance from the ground surface when the rockshaft is in the second rotational position, wherein the first distance is less than the second distance.

14. The industrial task machine of claim 12, wherein the first external end cap includes a first protrusion that surrounds a first portion of a frame section and the first fastener surrounds a second portion of the frame section to couple the first end cap to the frame.

15. The industrial task machine of claim 14, wherein the first external end cap protrusion and the first fastener substantially encircle the frame section.

16. The industrial task machine of claim 15, wherein the first external end cap protrusion inhibits rotation of the first external end cap about the frame section.

17. The industrial task machine of claim 15, wherein the first fastener inhibits rotation of the first external end cap about the frame section.

18. The industrial task machine of claim 11, wherein the first internal end cap has a first axial length and the second internal end cap has a second axial length, wherein the first axial length is greater than the second axial length.

19. The industrial task machine of claim 11, wherein the first external end cap is rotatable with respect to the first internal end cap, and wherein the second external end cap is rotatable with respect to the second internal end cap.

20. A rockshaft end cap assembly coupled to a rockshaft having an outer surface, an inner surface and an open end, the rockshaft end cap assembly comprising:
an internal end cap positioned on the open end of the rockshaft, the internal end cap having an inner surface and an outer surface, the inner surface of the internal end cap contacting the outer surface of the rockshaft;
an external end cap positioned on the open end of the rockshaft, the external end cap contacting the outer surface of the internal end cap; and
a fastener coupling the external end cap to a vehicle frame to retain the external end cap on the rockshaft.

* * * * *